(12) United States Patent
Hosoya

(10) Patent No.: US 6,290,244 B1
(45) Date of Patent: Sep. 18, 2001

(54) SUSPENSION DEVICE FOR VEHICLES

(75) Inventor: Haruyuki Hosoya, Kanagawa (JP)

(73) Assignee: Isuzu Motors Limited, Tokyo (JP)

(*) Notice: Subject to any disclaimer, the term of this patent is extended or adjusted under 35 U.S.C. 154(b) by 0 days.

(21) Appl. No.: 09/230,469
(22) PCT Filed: May 25, 1998
(86) PCT No.: PCT/JP98/02273
§ 371 Date: Jan. 26, 1999
§ 102(e) Date: Jan. 26, 1999
(87) PCT Pub. No.: WO98/54015
PCT Pub. Date: Dec. 3, 1998

(30) Foreign Application Priority Data

May 26, 1997 (JP) .................................................. 9-149942

(51) Int. Cl.[7] .............................. B60G 11/28; F16F 9/04; F16F 9/32
(52) U.S. Cl. ..................................................... 280/124.157
(58) Field of Search ..................................... 280/124.157

(56) References Cited

U.S. PATENT DOCUMENTS 5,133,575 * 7/1992 Zantinge et al. .............. 280/124.157
5,785,345 * 7/1998 Barlas et al. ................... 280/124.157

FOREIGN PATENT DOCUMENTS

| 3811306 | 11/1988 | (DE) . |
| 4213676 | 10/1993 | (DE) . |
| 4230249 | 3/1994 | (DE) . |
| 0 080 561 | 6/1983 | (EP) . |
| 0160371 | 11/1985 | (EP) . |
| 0647795 | 4/1995 | (EP) . |
| 60-174605 | 11/1985 | (JP) . |
| 05-169956 | 7/1993 | (JP) . |
| 07-174176 | 7/1995 | (JP) . |
| 02-513618 | 4/1996 | (JP) . |
| 09-048224 | 2/1997 | (JP) . |
| 09-099720 | 4/1997 | (JP) . |

* cited by examiner

Primary Examiner—Kenneth R. Rice
(74) Attorney, Agent, or Firm—Browdy and Neimark

(57) ABSTRACT

For prevention against the air leakage from the air springs in the suspension assembly for a road vehicle, it is disclosed to eliminate the interference that will happen between beams mounted to axle housings and air springs disposed between the beams and the frame. Air springs 60 are arranged between a frame 2 and the extremities of beams 24 mounted to axle housings. On each of the air springs 60, there is provided a relief 82 between the beam 24 and the lowest end of a housing 68 which constitutes a plunger 85 serving as a second support member of the air spring 60. This relief 82 makes it possible to prevent the interference that is thought to happen between the bent beam 24 and the housing 68 when the beam 24 deflects. Hence, the housings 68 are kept from the damages due to the collision with the beams 24 and further it is ensured to keep air-tightly auxiliary air chambers 69 communicated with air chambers 66 in diaphragms 66 through air passages 73.

1 Claim, 4 Drawing Sheets

SUSPENSION DEVICE FOR VEHICLES

TECHNICAL FIELD

The present invention relates to a suspension assembly adapted for use in road vehicles.

BACKGROUND ART

A rear two-axle road vehicle 1 shown in FIG. 3 of the accompanying drawings is a common heavy-duty road vehicle having a front axle and a rear two-axle set 4 attached to a frame 2. In this type of rear two-axle road vehicles, the rear two-axle set 4 is conventionally composed of a forwardly positioned driving axle 5 and a rearwardly positioned driven axle 6 while only two out of six wheels including front wheels are powered to thereby provide the driving system what is known as the rear two-axle, single powered axle (6×2) system for rendering the power transmission system simple in structure. The gross vehicle weight WG of the vehicle weight and the load weight may be shared to a load WF to be supported by the front wheels or tires on the front axle 3 and the other load WR to be charged by the rear wheels or tires 8, 9 on the rear axles 5, 6. The load WR charged on the rear two-axle set is further divided into a load WRF allotted to the driving axle 5 and the other load WRR allotted to the driven axle 6 and usually the shared loads WRR and WRF are equal with each other. This makes it possible to reduce the axle load to be charged on each axle while increase the permissible loading capacity of the vehicles.

A common form of a suspension for the rear axle set 4 in the rear two-axle road vehicle 1 is comprised of elastic means interposed between the frame 2 and each of axle housings supporting the axles 5, 6 for rotation, such as leaf springs, air springs as disclosed in Japanese Patent Laid-Open No. 169956/1993, and combined types of leaf springs and air springs. In any type of elastic means, resonance occurs when the frequency of the frame 2 approaches the natural frequency of the elastic means so that the frame is hard to be damped down in vibrations. To cope with this, shock absorbers have been conventionally equipped for cushioning the vibratory energy of the frame.

For the suspension system for the rear multi-axle set 4, there has been further developed an air suspension system in which both the driving axle 5 and driven axle 6 are pneumatically supported by the action of air springs 21, an example of which is shown in FIG. 4. The air springs 21, although various tanks and piping are required, may offer a noticeable advantage of the possibility of reducing the weight as compared with the leaf springs. The air suspension system described above may provide a supple support of the frame 2 on the wheels, but the spring rate of the air springs 21 is low and therefore the frame is apt to suffer the unbalanced fluctuations of large vertical displacement, what is known as sway or roll, under even a little variation in exerted forces. The prior air suspension system with air springs adapted for use in the rear two-axle load vehicle usually has the stabilizers greater in stiffness, as compared with the suspensions having other types of spring, to keep the frame 2 at a constant horizontal attitude.

The frame 2 in FIG. 4 is primarily composed of fore-and-aft side members 20 spaced sidewise apart from each other, and a cross member 29 extending transversely midway of the rear axle set 4. Torque rod brackets 22 are arranged midway of the rear axle set 4 and secured to the outside of the side members 20 through mounting plates 23. The torque rod brackets 22 extend under the horizontal levels linking the axle centres of the driving and driven axles 5 and 6. Fore-and aft horizontal beams 24 are further mounted underneath the widthwise opposing ends of the axle housings 13, 14 for the driving and driven axles 5 and 6 through mounting units 25. The horizontal beams 24 are each provided at the lengthwise opposing ends thereof with air springs 21, eight or which are provided per the rear axle set 4 so that the loads exerted on the rear axle set 4 are shared to eight air springs 21 with the result of reducing the loads per each air spring. It will be thus understood that the loads imparted to the air springs 21 are transmitted through axle housings 13, 14 to the tires 8, 9 on the earth. Because the air springs 21 are low at spring rate, the suspension of the air springs 21 alone is apt to cause the vibrations of the frame 2 and, when resonance occurs, the vibrations are hard to be attenuated. To deal successfully with attenuation of the vibrations, shock absorbers 26 have been provided between the horizontal beams 24 and the frame 2.

Provided on the opposing sides transversely of the vehicle between the torque rod brackets 22 and the horizontal beams 24 mounted to the axle housings 13, 14 are torque rods 17, the ends of which are pivotally connected to the bottom of the horizontal beams 24 and the lower portions of the torque rod brackets 22 through pivot pins 27 each having axis extending sidewise vehicle. The pivot pins 27 in FIG. 4 are shown on the only one side of the vehicle. The torque rods 17 may transmit the forces imparted along the lengthwise directions thereof and therefore they make it possible to transmit the fore-and-aft forces such as the driving and braking thrust forces that will occur between the frame 2 and wheels at acceleration and deceleration of the vehicle. Whereas the torque rods 17 allow the unit wheels of the tires, axle housings 13, 14 and beams 24 to move vertically relative to the frame 2 owing to the road irregularities. Hence, the suspension system may cope with the vertical movement to cushion the direct transmission of the impact from the road surface to the frame 2.

The side members 20, 20 midway of the rear axle set 4 are fixed to a cross member 29 by means of, for example, rivets or bolts. A forwardly positioned V-rod 33 is arranged between the axle housing 13 and crossing sections 30 at which the opposing ends of the cross member 29 mate with their associated side members 20 while a rearwardly positioned V-rod 33 is arranged between the axle housings 14 and the crossing sections 30. The forwardly positioned V-rod 32 is arranged in a rearwardly diverged manner between the crossing sections 30 and a housing cover 31 in which is enclosed a differential gear for the driving axle 5. Secured on bulged portion of the housing cover 31 integral with of the axle housing 13 for the driving axle 5 is a fore-mounting bracket 35 to which is mounted a merging extremity 34 of the forwardly positioned V-rod 32. Moreover mounted to both the frame 2 and cross member 29 at the crossing sections 30 are crossing brackets 37 to which are attached to leg ends 36 of the forwardly positioned V-rod 32. It will be understood that the merging extremity 34 is in integrity with the leg ends 36 through major rod sections.

The rearwardly positioned V-rod 33 is arranged in a forwardly diverged manner between the crossing sections 30 and an aft-mounting bracket 38, which is secured on the axle housing 14 for the driven axle 6. Pivotally mounted to the aft-mounting bracket 38 on the axle housing 14 for the driven axle 6 is a merging extremity 39 of the rearwardly positioned V-rod 33. Moreover mounted to both the frame 2 and cross member 29 at the crossing sections 30 are crossing brackets 41 to which are attached leg ends 40 of the rearwardly positioned V-rod 33. It will be understood that the merging extremity 39 is also in integrity with the leg ends 40 through major rod sections. The crossing brackets 37, 41 are disposed in symmetry with each other and connected in back to back relation while sandwiching the cross member 29 therebetween.

Like the torque rods 17, both the V-rods 32, 33 should allow the vertical movement of the rear axle set 4, inclusive of the tires 8, 9 and axle housings 13, 14, with respect to the frame 2 to thereby provide the adequate suspension function for cushioning the impact of the road irregularities. To this end, the forwardly positioned V-rod 32 is connected at the merging extremity 34 thereof with the fore-mounting bracket 35 for rotation about an axis parallel with the driving axle 5, while the other V-rod 33 is connected at its merging extremity 39 with the aft-mounting bracket 38 for rotation about an axis parallel with the driven axle 6. Similarly, both the V-rods 32, 33 are respectively connected at their leg ends 36, 40 to the crossing brackets 37, 41 for rotation about axes intersecting with the major rods of the V-rods. Rotating movement of the leg ends 36, 40 relative to the crossing brackets 37, 41 is not simple rotation, but complex rotation and therefore both the merging extremities 34, 39 and leg ends 36, 40 should be kept from inadvertent motions relative to the brackets 35, 38, 37, 41 to help ensure the complex rotation. To deal with such requirement, friction bushings are interposed at the brackets 35, 38, 37, 41 to make it possible to rotate in frictional sliding manner.

The V-rods 32, 33, like the torque rods 17, may transmit the fore-and aft forces imparted between the frame 2 and axle housings 13, 14. The V-rods 32, 33 may further transmit the lateral or sidewise forces imparted between the frame 2 and housings 13, 14 because of their V-like structure.

Spanned transversely of the vehicle underneath the fore-and-aft horizontal beams 24 secured to the axle housing 13 for the driving axle 5 is a stabilizer for the driving axle, that is, a first stabilizer 42 represented by only one of first arm sections 44 extending forwardly of the vehicle. First rods 47 are attached for rotation at upper pivotal ends 48 thereof to the frame 2 through brackets 46 while depending downwards and connected pivotally at lower ends 49 thereof to the foremost ends of the first arm sections 44. Similarly provided underneath the horizontal beams 24 associated with the driven axle 6 are a second stabilizer 52 composed of a second torsion-bar section 53 and second arm sections 54 and supported for rotation at 55 underneath the horizontal beams 24. Second rods 57 are attached for rotation at upper pivotal ends 58 thereof to the frame 2 through brackets 56 while depending downwards and connected pivotally at lower ends 59 thereof to the foremost ends of the second arm sections 54. If the vertical clearance between the frame 2 and the axle housings 13, 14 varies relatively at any one side transversely of the vehicle owing to the roll or sidewise titling of the vehicle, both the first and second stabilizers 42, 52, like the stabilizers 18, 19 in the trunnion-equipped suspension system shown in FIG. 3, may generate the twisting forces in response to the relative deviation to thereby act so as tocause the same relative vertical deviation for the clearance between the frame 2 and the axle housings 13, 14 at the opposing side of the vehicle, resulting in preventing the roll of the vehicle.

A common structure of the conventional air springs is shown in FIG. 5 illustrating a sectional view of an air spring 21. The air springs 21 are to support the frame 2 on the horizontal beams 24, which are mounted to the axle housings for holding the axles for rotating movement. The air springs 21 are each comprised of a first support member, or a carrier plate 61, attached to the frame 2, or the side member 20 shown in FIG. 4, a second support member, or a plunger 62, mounted on the horizontal beam 6, a cylindrical diaphragm 63 secured air-tightly at any one 64 of annular opposing open-ends thereof to the carrier plate 61 and also at the other annular open-end 65 thereof to the beam 24. The diaphragm 63 defines therein an air chamber 66 for the air spring 21. The beams 24, as shown in FIG. 4, extend fore and aft the vehicle underneath the axle housings and the air springs 21 are disposed between the frame 2 and the fore-and-aft extremities of the beams 24.

The plungers 62 for the second members each comprise a boss 67 secured to the beam 24, and a housing 68 defining an auxiliary chamber 69 around the boss 67. The plungers 62 may make the relative reciprocating movement in the air chambers 66, depending on the load applied onto the frame 2 resting on the air springs 21. The housing 68 of the plungers 62 are each composed of a ceiling section 70 to which is hermetically secured the diaphragm 63, a skirt section 71 depending downwards from the ceiling section 70, and a bottom section 72 secured hermetically to the lower open-end of the skirt section 71. It will be thus understood that an auxiliary air chamber 69 is defined with the combination of the ceiling section 70, skirt section 71 and bottom section 72. The plungers 62 are mounted to the beams 24 by means of bolts 74 each of which is inserted through hole 75 in the beam 24 and screwed into the boss 67 of the plunger 62 to thereby urge the plunger 62 to the upper surface 76 of the beam 24.

The auxiliary air chambers 69 are each communicated to the associated air chamber 66 through air passages 73 in the ceiling section 68 of the housing 68. Fluctuation in the load exerted on the air springs 21 causes the compression and expansion of the air confined in both the air chambers 66 and the auxiliary air chambers 69. Meantime, the air chambers 66 within the diaphragms 63 may vary in volume, nevertheless the auxiliary air chambers 69 may undergo no change in volume and therefore the air in the auxiliary air chambers 69 may vary in pressure simultaneously with the pneumatic air in the air chambers 66. This makes it possible to lower the pneumatic fluctuations in the air chambers 66 as well as the auxiliary air chambers 69 to thereby eliminate the excessive restorable force with the result of more stable suspension function.

The diaphragms 63 are connected to the plungers 62 and the carrier plates 61 by press fitting. The carrier plates 61 may be mounted to the lengthwise side surfaces of the side members 20 by means of rising members 77 which are integral with the carrier plates 61. The diaphragms 63 each have at the opposing open-ends 64, 65 thereof annular ridgy edges that are respectively fitted in annular recesses 78, 79 on the underside of the carrier plate 61 and the upper surface of the ceiling section 70 of the plunger 62. It is to be noted that there is no requirement of bonding means such as adhesives or the like for connecting integrally the diaphragms 63 to the plungers 62 and the carrier plates 61 because the higher the pneumatic pressure in the air chambers 66 is, the greater is the force to urge the annular ridgy edges 64, 65 of the diaphragms 62 against the annular recesses 78, 79 of the carrier plates 61 and the plungers 62 for making the air-tight connection therebetween.

The beams 24 of cast iron are generally greater in weight with the result of raising the fuel-consumption of the vehicle and therefore it has been developed to produce the beams 24 from aluminum alloys to render the vehicle less in weight. The structure of the beams 24 having mounted with the air springs 21 as described Just above, however, in case the impact of road irregularities is exerted between the wheels and the frame 2, is apt to cause the flexure deformation in the beams 24 such that the deflection in the beams increase gradually with a distance from the midway portion mounted to the axle housing towards the fore-and aft extremities, as shown in figure by a dashed line. It will be known to those skilled in the art that the modulus of elasticity in tension, or Young's modulus, of the aluminum alloy is generally about one third that of the cast iron. Accordingly, the beam 24 of aluminum alloys is subject to the large bending deformation while being damaged at an interfacial area, especially at a encircled area A, between the upper surface 76 of the beam 24 and the lowest surface 80 of the skirt section 68. This causes the critical problem in which the welds of the skirt sections 71 with the bottom sections 72 are ruptured resulting in leakage of the pressurized air in both the auxiliary air chambers 69 and the air chambers 66 communicated with the auxiliary air chambers 69 through air passages 73 and further in loosening of the fastening bolts 74 whereby the air springs 21 become inactive in their inherent function.

An primary object of the present invention is to overcome the above-described problem and therefore to provide a suspension assembly for a road vehicle comprised of air springs provided between a frame and beams mounted to axle housings supporting axles for rotating movement, and the air springs each having an air chamber formed from a diaphragm and an auxiliary air chamber formed in a plunger, the improvement wherein isolation of interfacial areas between the beams and the lowest surfaces of skirt sections of housings of the air springs from deflection of the beams makes it possible to keep the beams from damages while preventing the leakage of the pressurized air from the auxiliary air chambers owing to the rupture of the plungers.

Disclosure of Invention

The present invention is concerned with a suspension assembly for a road vehicle, comprising beams mounted to axle housings supporting therein axles, and air springs secured to the beams and provided with air chambers supporting thereon a frame, the improvement characterized in that the air springs are each comprised of a first support member secured to the frame, a second support member secured to any one of the beams, and a diaphragm connected air-tightly at one end thereof to the first support member and at the other end thereof to the second support member to thereby define the air chamber, the second support member being composed of a boss secured to its associated beam and a housing formed around the boss, and at least any one of the housing and its associated beam being provided with a relief for eliminating an interference that happens between the beam and the housing owing to a deflection of the beam.

According to the suspension assembly for a road vehicle of the present invention, the second support members secured to the beams are each composed of a boss secured to its associated beam and a housing formed around the boss, and at least any one of the housing and its associated beam is provided with a relief for eliminating an interference that happens between the beam and the housing owing to a deflection of the beam. This makes it possible to keep the beams from damages while preventing the air leakage from the auxiliary air chambers owing to the breaks of the plungers.

The housings of the second support members are each provided therein with an auxiliary air chamber that is arranged around the boss and communicated with the air chamber. The auxiliary air chambers are, unlike the air chambers defined with the diaphragms, constant in volume and therefore may help ensure the stable characteristics of the air springs.

Further the beams are made of aluminum alloys, which are in general less in Young's modulus than the cast iron and therefore tend to occur the flexure deformation. The provision of the relief may eliminate the interference between the beams and the housings to effectively protect the air springs from the breaks that are more likely to occur.

The second support members each are of a plunger movable in the air chamber in a reciprocating manner in response to a load to be supported by the air springs. The second support members of the plungers movably fitted in the large air chambers may render the air springs stable in operation provide and moreover provide the large operative areas.

The housings in the second support members each comprise a ceiling section to which is air-tightly secured the diaphragm, a skirt section depending downwards from the ceiling section, and a bottom section closing hermetically a downwardly opened end of the skirt section. The structure of the housings as described just above makes it possible to build the auxiliary air chambers with high efficiency, nevertheless the breaks of air-tight sealing at the auxiliary air chambers due to the damages at the housings become more likely to occur. To cope with this, it is preferred to provide the relief between the housings and their associated beams.

Moreover, the beams extend fore and aft the vehicle underneath the axle housings, and the air springs are arranged between the frame and the lengthwise opposing extremities of the beams. Mounting the air springs on the fore-and-aft extremities of the beams causes each air spring to share equally the load of the frame, resulting in reducing the loads exerted on the air springs while ensuring the load balance on the axle housings in symmetry with respect to the axle housings for good road-handling characteristics.

BEST MODE FOR CARRYING OUT THE INVENTION

Figure 1:
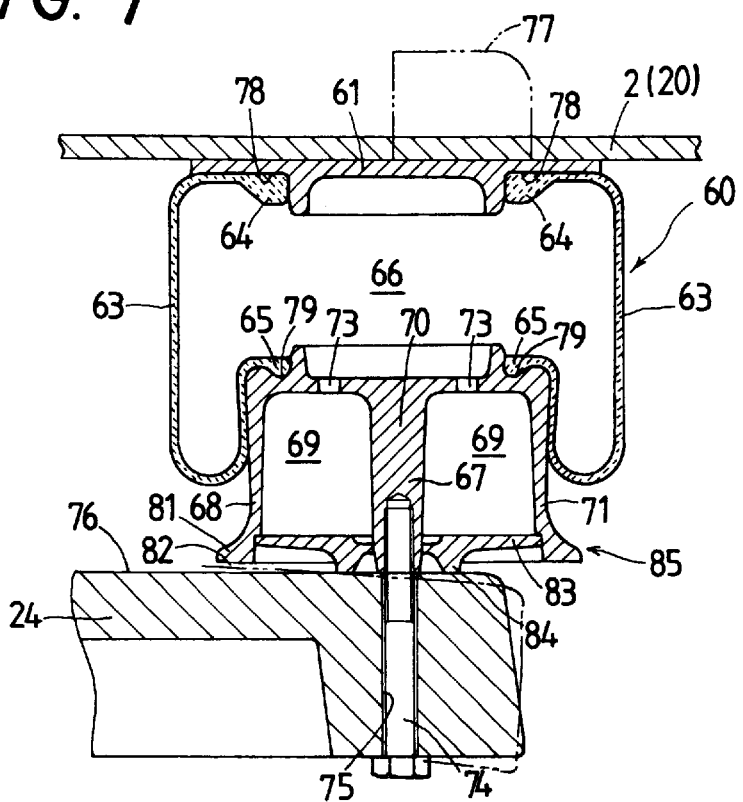
FIG. 1 is a sectional view showing a preferred embodiment of an air-spring suspension assembly for a road vehicle in accordance with the present invention.
Figure 4:
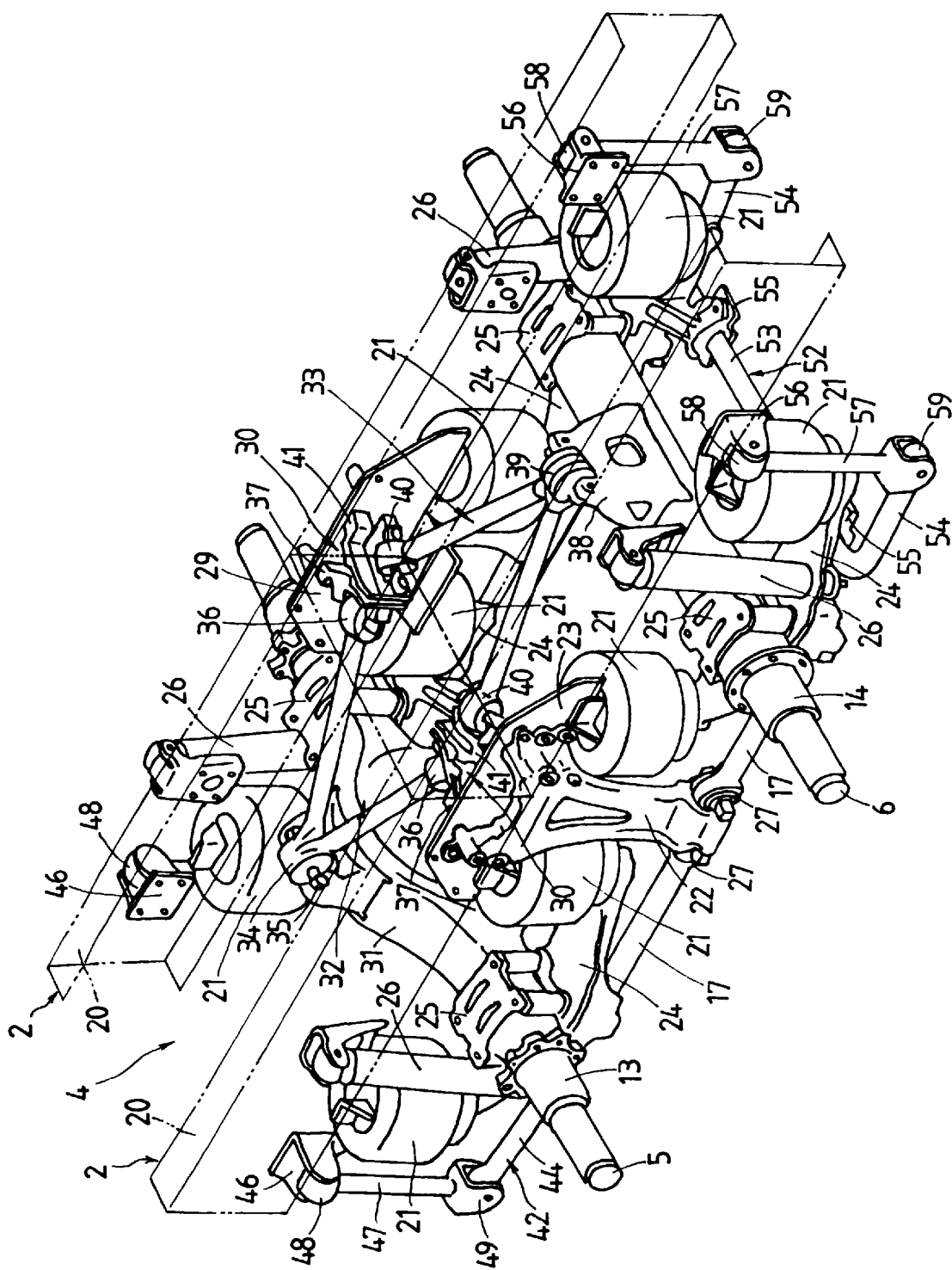
FIG. 4 is a fragmentary perspective view showing an embodiment of a rear multi-axle set in an air-spring suspension assembly for a rear two-axle road vehicle.
Figure 5:
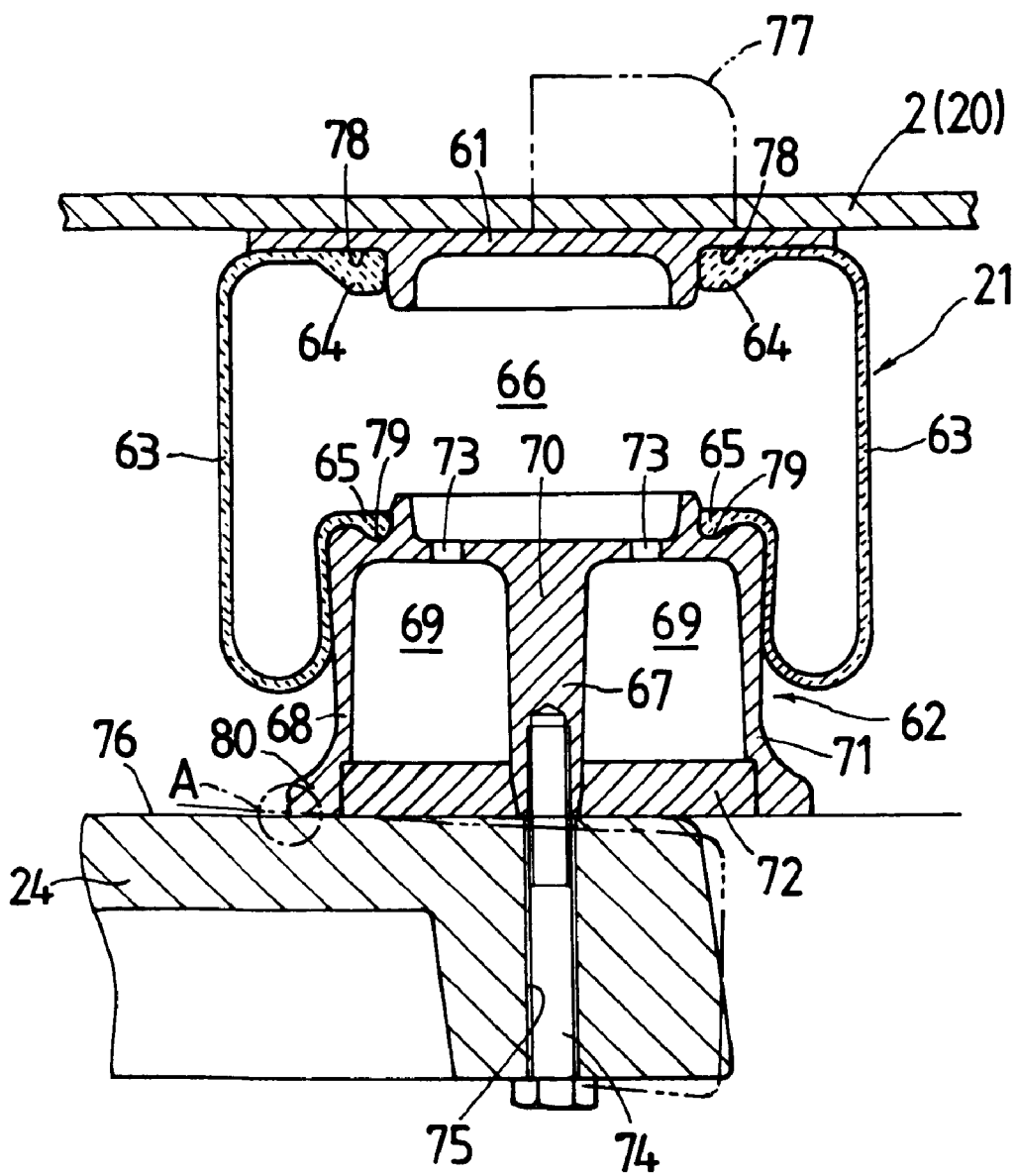
FIG. 5 is a sectional view illustrating a conventional air-spring suspension assembly for a road vehicle.

Referring now in detail to the drawings, a preferred embodiment of a suspension assembly for a road vehicle according to the present invention will be explained below. A suspension assembly shown in FIG. 1 is adapted for use in a suspension system in FIG. 4 and substantially equivalent with the suspension assembly in FIG. 5, except for the provision of a relief. Most components are the same as previously described above in connection with FIG. 5. To that extent, the components have been given the same characters, so that the previous description will be applicable.

The suspension assembly according to the present invention is applicable to various driving systems of vehicles including a rear two-axle, single powered axle (6×2) system or other powered axle system, for example, (6×4) system. On the embodiment shown in FIG. 1, the beam 24 has the upper surface 76 finished in a flat surface, while a plunger 85 has a skirt section 72 that is spaced at the lowest edge 81 thereof away from the upper surface 76 of the beam 24 so that no interference will happen between the beam 24 and an improved air spring 60 within at least an area where the suspension performance will be normally operative. This provides a relief 82 between the beam 24 and the housing 68 so as to prevent the interference that is thought to happen between the bent beam 24 and the housing 68 when the beam 24 subject to the load of the frame 2 deflects downwards a distance gradually greater towards the extremities of the beam, the bent beam 24 being schematically illustrated with a phantom line in FIG. 1. Even the beam 24 made of aluminum alloys greater in flexure deformation, the relief 82 may keep the housing 68 from the interference with the bent beam 24 to thereby eliminate the adverse situation where the leakage of the pressurized air in the auxiliary air chambers 69 owing to the deformation of the housing 68 makes the air spring inactive in their inherent function, as having been experienced in the prior air springs 21. The plunger 85 has a bottom section 83 that is rendered less in thickness so as to not extend downwardly over the lowest end of the skirt section 71, except for an annular abutment 84 arranged to the center of the plunger in contact relation with the upper surface 76 of the beam 24.

Figure 2:
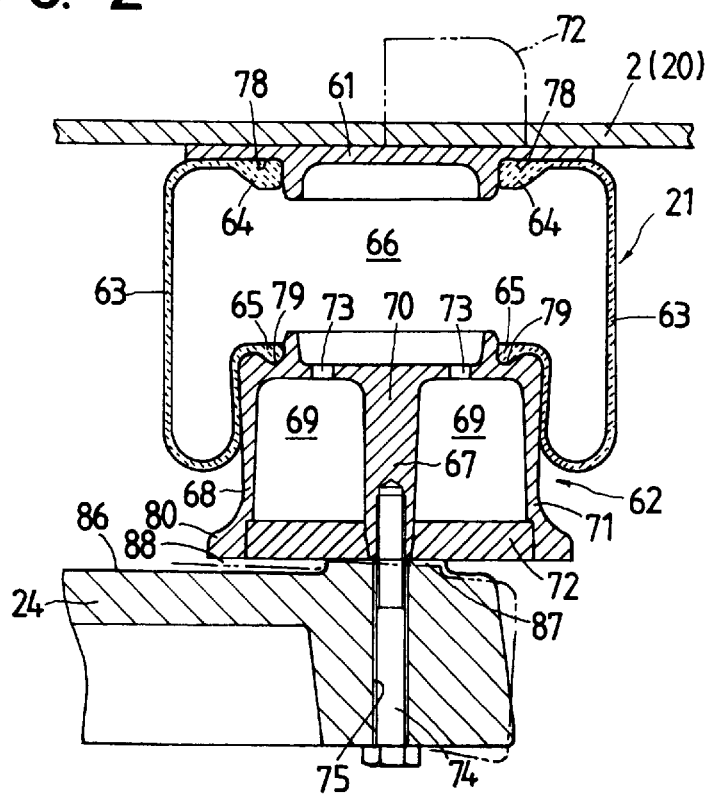
FIG. 2 is a sectional view showing another embodiment of an air-spring suspension assembly for a road vehicle in accordance with the present invention.
Figure 3:
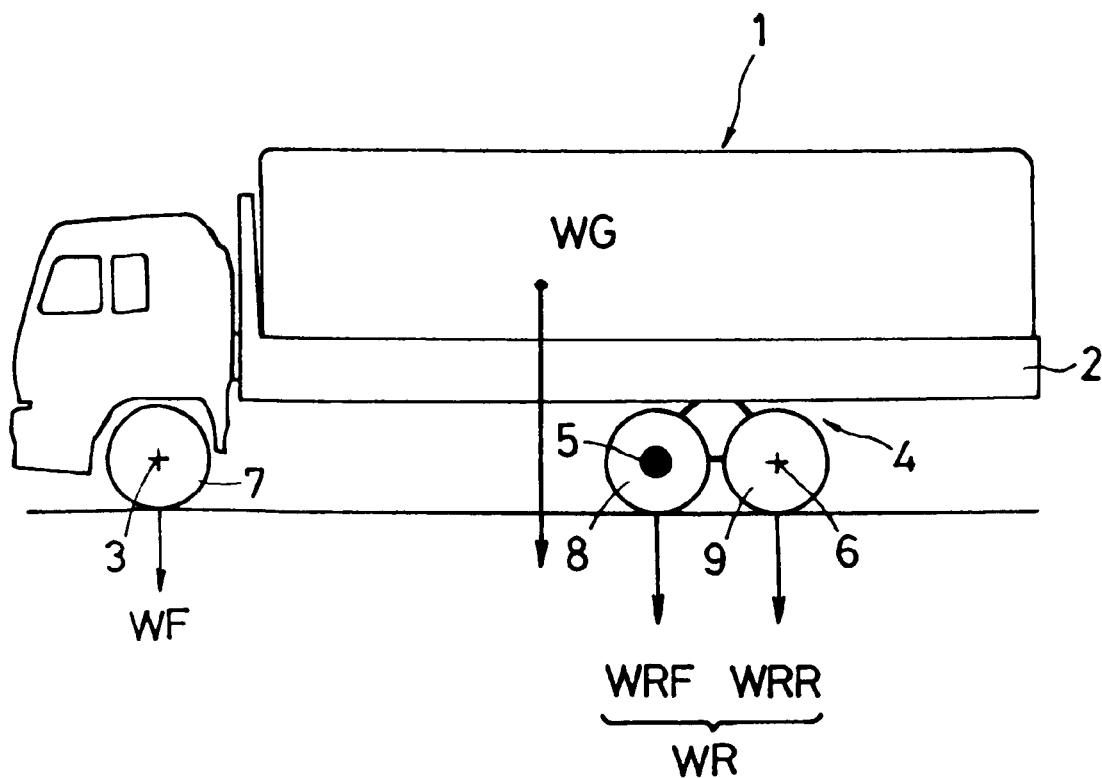
FIG. 3 is a schematic side elevation illustrating the outline of the conventional rear two-axle road vehicle.

Another embodiment of the suspension assembly in FIG. 2 differs from the first embodiment in FIG. 1, in that the relief is formed on the upper surface of the beam 24. The suspension assembly for a road vehicle shown in FIG. 2 is substantially equivalent with the suspension assembly in FIG. 5, except for the formation of the relief. The plunger 62 is the same as previously described above in connection with FIG. 5. To that extent, the components have been given the same characters, so that the previous description will be applicable. The suspension assembly for a road vehicle in FIG. 2 has a relief 88 that is formed by partially shaving down the beam 24 at its upper surface 86, in contrast to the beam 24 in FIG. 5, so as to a clearance between the beam 24 and the lowest edge 80 of the skirt section 71. The relief 88 thus formed between the beam 24 and the housing 68 may prevent the interference that happens between the bent beam 24 and the housing 68 when the beam 24 subject to the load of the frame 2 deflects downwards a distance gradually greater towards the extremities of the beam, the bent beam 24 being schematically illustrated with a phantom line in FIG. 2. An abutment area 87 left on the beam 24 helps ensure the abutment relation of the beam 24 to the bottom section 72 of the plunger 87. As an alternative not shown in figures, the relief may be formed across both the beam and the plunger.

Industrial Applicability

In a suspension assembly for a road vehicle comprised of air springs provided between a frame and beams mounted to axle housings supporting axles for rotating movement, and the air springs each having an air chamber formed from a diaphragm and an auxiliary air chamber formed in a plunger, the improvement according to the present invention resides in that isolation of interfacial areas between the beams and the lowest surfaces of skirt sections of housings of the air springs from deflection of the beams makes it possible to keep the beams from damages while preventing the leakage of the pressurized air from the auxiliary air chambers owing to the rupture of the plungers.

What is claimed is:

1. A suspension assembly for a road vehicle, comprising beams mounted to axle housings supporting therein axles, and air springs secured to the beams and provided with air chambers supporting thereon a frame, wherein the beams are made of aluminum alloys, the beams extend fore and aft the vehicle underneath the axle housings while the air springs are arranged between the frame and the lengthwise opposing extremities of the beams, the air springs are each comprised of a first support member secured to the frame, a second support member secured to one of the beams, and a diaphragm connected air-tightly at one end thereof to the first support member and at the other end thereof to the second support member to thereby define a first air chamber, the second support member being composed of a boss secured to its associated beam and a housing formed around the boss, the second support member thereby providing a plunger movable in the first air chamber in a reciprocating manner in response to a load to be supported by the air springs, further wherein the housing in the second support member comprises a ceiling section to which is airtightly secured the diaphragm, a skirt section depending downwards from the ceiling section, and a bottom section closing hermetically a downwardly opened end of the skirt section, thereby providing, in the second support member, an auxiliary air chamber that is arranged around the boss and that communicates with the first air chamber, and wherein at least one of the housing and its associated beam is provided with a relief for eliminating an interference that happens between the beam and the housing owing to a deflection of the beam.

* * * * *